(12) United States Patent
Chang et al.

(10) Patent No.: US 10,516,822 B2
(45) Date of Patent: Dec. 24, 2019

(54) METHOD AND DEVICE FOR MERGING IMAGES OF CALIBRATION DEVICES

(71) Applicant: INDUSTRIAL TECHNOLOGY RESEARCH INSTITUTE, Hsin-Chu (TW)

(72) Inventors: Chin-Kuei Chang, New Taipei (TW); Shang-Chieh Lu, Tainan (TW); Wei-Yao Chiu, Chiayi (TW); Bor-Tung Jiang, Hsinchu (TW)

(73) Assignee: INDUSTRIAL TECHNOLOGY RESEARCH INSTITUTE, Hsin-chu (TW)

( * ) Notice: Subject to any disclaimer, the term of this patent is extended or adjusted under 35 U.S.C. 154(b) by 576 days.

(21) Appl. No.: 14/982,562

(22) Filed: Dec. 29, 2015

(65) Prior Publication Data
US 2017/0111580 A1    Apr. 20, 2017

(30) Foreign Application Priority Data
Oct. 16, 2015   (TW) .............................. 104134070 A

(51) Int. Cl.
*H04N 5/232* (2006.01)
*G06K 9/20* (2006.01)
(Continued)

(52) U.S. Cl.
CPC ....... *H04N 5/23238* (2013.01); *G06K 9/2054* (2013.01); *G06K 15/027* (2013.01);
(Continued)

(58) Field of Classification Search
CPC ....... G06T 2200/32; G06T 15/04; G06T 7/38; G06T 7/40; G06T 2207/10141;
(Continued)

(56) References Cited

U.S. PATENT DOCUMENTS 5,986,279 A     11/1999  Dewaele
6,057,850 A *   5/2000   Kichury ................ G06T 15/503
                                                    345/584
(Continued)

FOREIGN PATENT DOCUMENTS

CN        101319895 A       12/2008
CN        101414379 A       4/2009
(Continued)

OTHER PUBLICATIONS

Intellectual Property Office, Ministry of Economic Affairs, R. O. C, "Office Action", dated Jan. 16, 2017, Taiwan.
(Continued)

*Primary Examiner* — Kenny A Cese
(74) *Attorney, Agent, or Firm* — Locke Lord LLP; Tim Tingkang Xia, Esq.

(57) ABSTRACT

The present disclosure provides an image merging method. The image merging method includes the following step. First, the calibration unit is provided, wherein a calibration device of the calibration unit includes a plurality of known characteristic information. The calibration device is captured. A conversion relationship is created. A relationship of positions of the images is analysis according to the conversion relationship. The images are formed. In additional, an image merging device is provided.

21 Claims, 8 Drawing Sheets

(51) Int. Cl.
  *G06T 7/40* (2017.01)
  *G06K 15/02* (2006.01)

(52) U.S. Cl.
  CPC ........ *G06T 7/40* (2013.01); *G06K 2009/2045* (2013.01); *G06T 2207/10141* (2013.01); *G06T 2207/20221* (2013.01)

(58) Field of Classification Search
  CPC .. G06T 2207/20221; G06K 2009/2045; G06K 9/46; G06K 2209/01; G06K 9/2054; H04N 5/23238
  See application file for complete search history.

(56) References Cited

U.S. PATENT DOCUMENTS

| | | | |
|---|---|---|---|
| 6,535,242 | B1 | 3/2003 | Strumolo et al. |
| 7,009,638 | B2 | 3/2006 | Gruber et al. |
| 7,259,784 | B2 | 8/2007 | Cutler |
| 7,646,932 | B1 | 1/2010 | Peterson |
| 7,936,374 | B2 | 5/2011 | Cutler |
| 8,242,895 | B2 | 8/2012 | Shen et al. |
| 8,345,961 | B2 | 1/2013 | Li et al. |
| 8,462,209 | B2 | 6/2013 | Sun |
| 8,823,796 | B2 | 9/2014 | Shen et al. |
| 9,087,256 | B2 | 7/2015 | Yu |
| 2003/0137586 | A1 | 7/2003 | Lewellen |
| 2005/0240342 | A1 | 10/2005 | Ishihara et al. |
| 2007/0211934 | A1 | 9/2007 | Pan et al. |
| 2008/0144899 | A1 | 6/2008 | Varma et al. |
| 2011/0096309 | A1 | 4/2011 | Paul Wiaux et al. |
| 2011/0234807 | A1* | 9/2011 | Jones ............... G08B 13/19641 348/159 |
| 2013/0322758 | A1* | 12/2013 | Matsushita ............... G06K 9/18 382/182 |
| 2014/0098229 | A1* | 4/2014 | Lu .......................... H04N 7/181 348/148 |
| 2014/0168482 | A1 | 6/2014 | Herman et al. |
| 2014/0378171 | A1* | 12/2014 | Rudow ................. H04W 64/00 455/456.6 |
| 2015/0077573 | A1* | 3/2015 | Ishikawa ................. G06T 3/005 348/189 |
| 2016/0091976 | A1* | 3/2016 | Kumar .................... G06F 3/017 345/156 |
| 2017/0006220 | A1* | 1/2017 | Adsumilli .......... H04N 5/23238 |

FOREIGN PATENT DOCUMENTS

| | | |
|---|---|---|
| CN | 101710932 B | 6/2011 |
| TW | I485631 B | 5/2015 |
| WO | 2010017531 A2 | 2/2010 |

OTHER PUBLICATIONS

Ze-lang Wang et al., An Adaptive Uniform Distribution SURF for Image Stitching, 6th International Congress on Image and Signal Processing, 2013, 888-892.

Haixiang Su et al., An Algorithm for Stitching Images with Different Contrast and Elimination of Ghost, Seventh International Symposium on Computational Intelligence and Design, 2014, 104-107.

Matthew Brown et al., Automatic Panoramic Image Stitching using Invariant Features, International Journal of Computer Vision, 2007, vol. 74, Issue 1, 59-73.

Yang Di et al., Image Stitching Based on Local Symmetry Features, Proceedings of the 33rd Chinese Control Conference, 2014, 4641-4646.

Yu Zhang et al., Image Stitching based on Particle Swarm and Maximum Mutual Information Algorithm, Journal of Multimedia, 2013, vol. 8, No. 5, 580-588.

Taeyup Song et al., Image stitching using chaos-inspired dissimilarity measure, Electronics Letters, 2015, vol. 51, No. 3, 232-234.

CNIPA, "Office Action", dated Jan. 11, 2019, China.

* cited by examiner

METHOD AND DEVICE FOR MERGING IMAGES OF CALIBRATION DEVICES

CROSS REFERENCE TO RELATED APPLICATION

This application also claims priority to Taiwan Patent Application No. 104134070 filed in the Taiwan Patent Office on Oct. 16, 2015 the entire content of which is incorporated herein by reference.

TECHNICAL FIELD

The present disclosure relates to an image merging method, and more particularly, to an image merging method and device utilizing a multiple image-capturing technique for capturing non-overlapping images.

BACKGROUND

With the rapid advance in industrial automation in recent years, inspection methods using machine vision are becoming more and more common, while simultaneously following the enhancement in process capability, the demand for higher detection precision is increasing. Conventionally the precision of detection is enhanced either by increasing the amount of image capturing devices in the detection area, or by replacing the current image capturing devices with other image capturing devices of higher pixel density. On the other hand, the detection can also be improved by scaling down the area of detection, by reducing visual range, or by adopting high zoom lenses for obtaining images with higher resolution. Nevertheless, although the detection precision is enhanced, sometimes it is achieved at the cost that inspection might not be able to proceed as the workpiece of interest or the interest area can not be captured completely inside the visual fields of the image capturing devices for detection.

In addition, conventionally an image composition process is performed based upon the acquisition of related image information. For example, for integrating two images into one composite image, the characteristic information of the two images is acquired first so as to identify the overlapping between the two images to be used in the image composition. Considering an inspection process for a specific food production line, the objective of the inspection process is to detect and identify problematic debris and scrap in a detection area that is generally filled will all kinds of pastes and stuffing. However, it is difficult to achieve as those pastes and stuffing are all about the same size and thus the difference between the resulting characteristic information extracted from detection images may not be obvious enough for forming a composite image with sufficient resolution.

SUMMARY

The present disclosure relates to an image merging method, capable of capturing non-overlapping images of an imaging area with larger field of view and higher image precision.

The present disclosure provides an image merging device, capable of utilizing a calibration unit to establish a relationship between an object space and an image plane and further establish the relationships between various image planes for merging images of those image planes into a composite image, and thereby, capable of merging non-overlapping images into a composite image while achieving larger field of view and higher system inspection ability.

In an embodiment, the present disclosure provides an image merging method, which comprising the steps of: providing a calibration unit which includes a plurality of calibration devices, being arranged corresponding to different positions of an object to be inspected while enabling each of the plural calibration devices to include a plurality of known characteristic information; imaging each of the plural calibration devices respectively for obtaining a raw image with a plurality of image characteristic information that are corresponding to the plural known characteristic information; establishing a conversion formula according to the plural known characteristic information of each of the plural calibration devices and the plural image characteristic information of the corresponding image; performing an analysis for obtaining position relationship between the plural raw images according to the conversion formula so as to stitch the plural raw images accordingly.

In an embodiment, the present disclosure provides an image merging device, which comprising: a calibration unit, a plurality of image capturing units and a process unit. The calibration unit further comprising a plurality of calibration devices, being arranged corresponding to different positions of an object to be inspected while enabling each of the plural calibration devices to include a plurality of known characteristic information. Each of the plural image capturing units is provided for capturing a raw image of its corresponding calibration device. The process unit is coupled to the plural image capturing units for receiving the raw images captured by the plural image capturing units. Operationally, each of the raw images includes a plurality of image characteristic information that are corresponding to the plural known characteristic information of its corresponding calibration device, and thus the process unit is enabled to establish a conversion formula according to the plural known characteristic information of each of the plural calibration devices and the plural image characteristic information of the corresponding image, while enabling the process unit to perform an analysis for obtaining position relationship between the plural image capturing units and the object according to the conversion formula so as to stitch the plural raw images accordingly.

By the use of the aforesaid image merging method and device, the known characteristic information of each calibration device in the calibration unit is imaged for establishing a conversion formula between the calibration devices and the raw images, and thereby further establishing the position relationships between various image capturing units accordingly. Thereafter, basing upon the position relationships, the plural raw images are stitched together into a composite image. Consequently, not only the plural non-overlapping raw images are stitched together into a composite image with high precision, but also a larger field of view relating to the object to be inspected is achieved.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
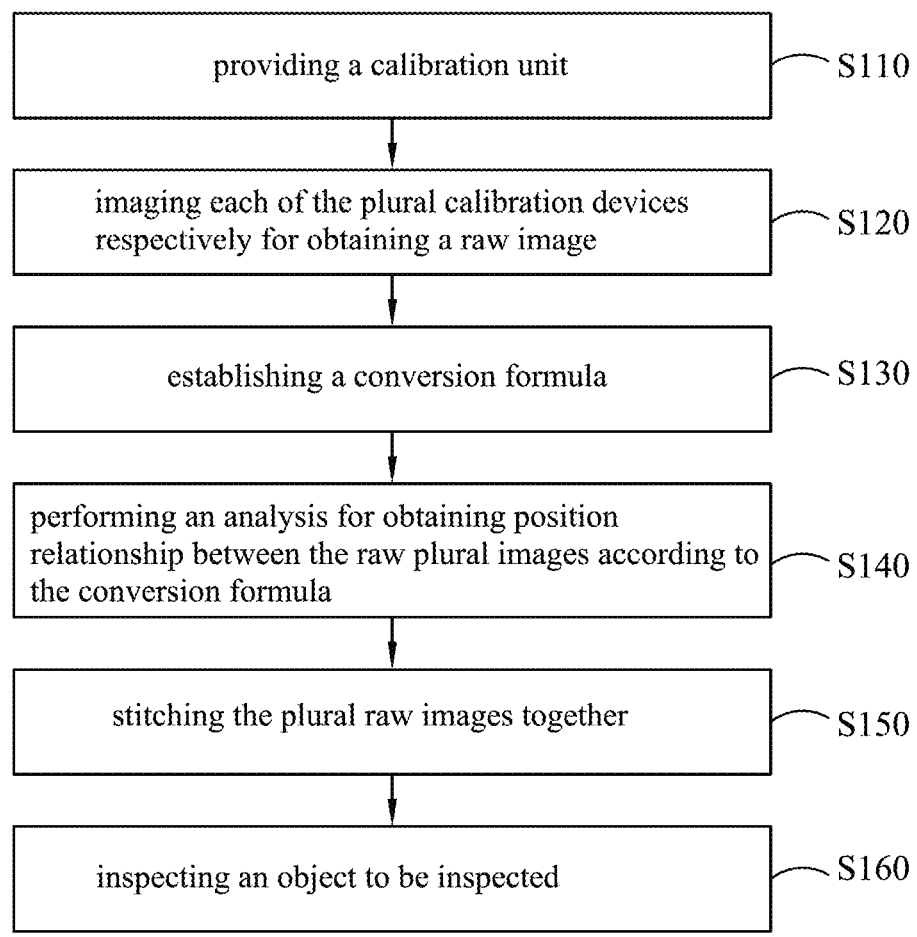
FIG. 1 is a flow chart depicting steps performed in an image merging method of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a flow chart depicting steps performed in an image merging method of the present disclosure. As shown in FIG. 1, the image merging method S100 of the present disclosure comprising the steps S110~S160.

The image merging method S100 starts from the step S110. At step S110, a calibration unit 110 is provided.

Figure 4:
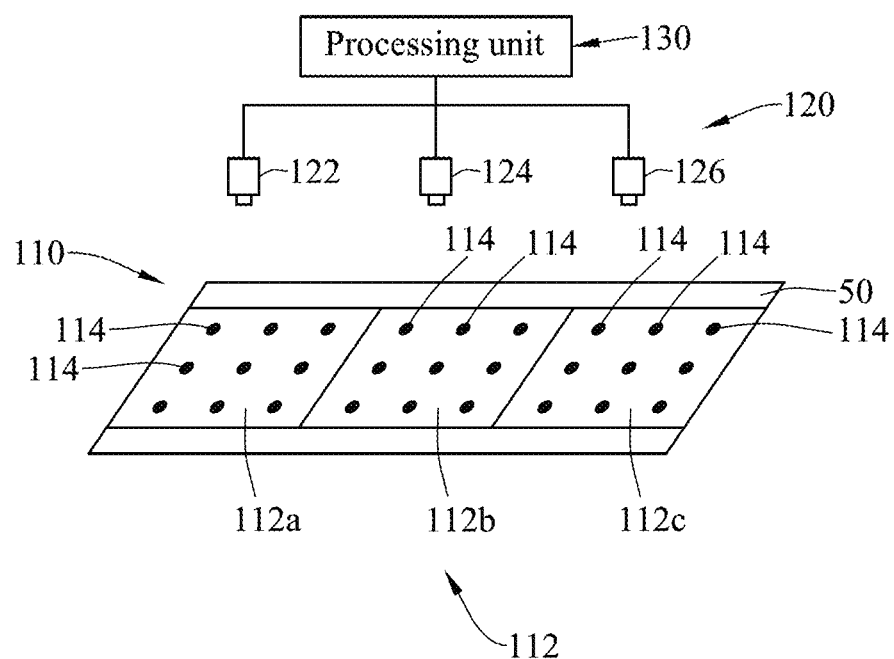
FIG. 4 is a schematic diagram showing an image merging device of the present disclosure.

Please refer to FIG. 4, which is a schematic diagram showing an image merging device of the present disclosure. In FIG. 4, the image merging device 100 comprising: a calibration unit 110, a plurality of image capturing units 120 and a processing unit 130, in which the processing unit 130 is coupled to the plural image capturing units 120 for receiving the raw images captured by the plural image capturing units 120. As well-known by one of ordinary skill in the art, the processing unit 130 is a processor, such as a central processing unit (CPU), that is capable of performing the instructions of a computer program.

The calibration unit 110 includes a plurality of calibration devices 112 that are disposed at different positions on an object to be inspected 50. In FIG. 4, there are three calibration devices 112, i.e. a first calibration device 112a, a second calibration device 112b and a third calibration device 112c, but it is not limited thereby. The first, second and third calibration devices 112a, 112b, 112c are aligned from left to right on the object 50 without overlapping with one another. It is noted that in this embodiment, the calibration devices 112 are formed with sizes that are smaller than the object 50, but also it is not limited thereby. Thus, in another embodiment, the calibration devices 112 can be formed in a size that is larger than and equal to the object.

In addition, each of the plural calibration devices 112 includes a plurality of known characteristic information 114, whereas the known characteristic information 114 in this embodiment refers to the distribution of patterns on the calibration devices 112. Thus, each calibration device 112 can be a textured plane with non-specific iteration structures, whereas the structure can be a pattern of various geometrical shapes. In the embodiment shown in FIG. 4, there are nine known characteristic information 114 of circular shape while being arranged into an array of equal spacing, but it is not limited thereby. That is, in another embodiments, each of the known characteristic information 114 can be a shape selected from the group consisting of: a rectangle, a square, a triangle, and a cross, or even each of the known characteristic information 114 can be a feature selected from the group consisting of: a line and a character. Moreover, the elements in the array of each known characteristic information 114 might not be evenly spaced. Therefore, the pattern distribution and arrangement of the known characteristic information 114 are determined according to actual requirements.

Figure 5:
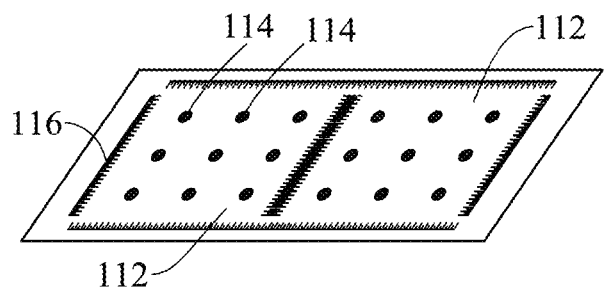
FIG. 5 is a schematic diagram showing a calibration device according to an embodiment of the present disclosure.

FIG. 5 is a schematic diagram showing a calibration device according to an embodiment of the present disclosure. In FIG. 5, the calibration devices 112 further includes a scale gage 116 and the known characteristic information 114, in which the scale gage 116 is disposed on the periphery of the known characteristic information 114, and is formed with markers or character symbols, and the markers or the character symbols that are provided for a user to determine the coordinates of the plural known characteristic information 114 and also the relative position relationships between the plural known characteristic information 114.

At the step S120 of FIG. 1, each of the plural calibration devices 112 is respectively imaged for obtaining a raw image with a plurality of image characteristic information that are corresponding to the plural known characteristic information 114 of its corresponding calibration device 112. Corresponding the aforesaid step to FIG. 4, the image capturing units 120 are used for imaging the calibration devices 112 for obtaining the corresponding raw images.

It is noted that each of the image capturing units 120 can be a device selected from the group consisting of: a charge-coupled device (CCD), a complementary metal-oxide semiconductor (CMOS), a pan-tilt-zoom camera, and a digital monitor, but it is not limited thereby.

Figure 6:
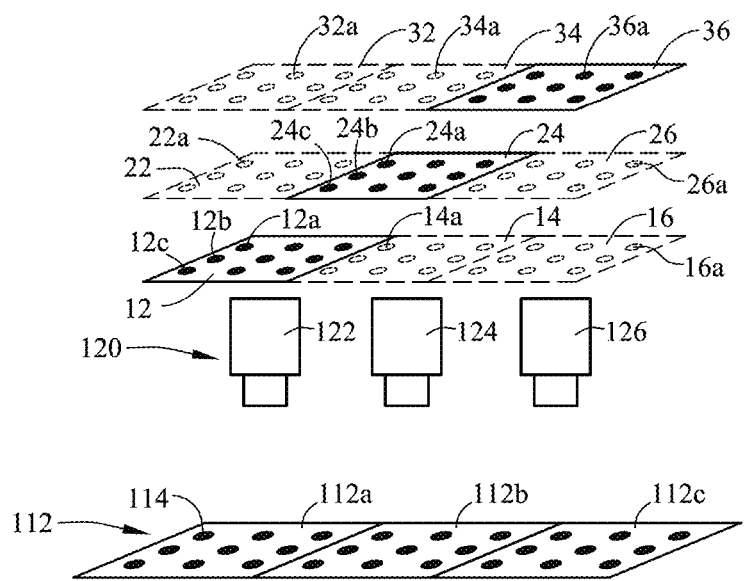
FIG. 6 is a schematic diagram showing an image merging device of the present disclosure in operation.

FIG. 6 is a schematic diagram showing an image merging device of the present disclosure in operation. It is noted that only a portion of the components is provided in FIG. 6 for simplicity and clarification. In FIG. 6, there are three image capturing units 120 that are disposed from left to right as a first image capturing unit 122, a second image capturing unit 124 and a third image capturing unit 126, corresponding to the three calibration devices 112a, 112b, and 112c.

By the aforesaid arrangement, a raw image 12 of the first calibration device 112a is captured by the first image capturing unit 122, a raw image 24 of the second calibration device 1122 is captured by the second image capturing unit 124, and a raw image 36 of the third calibration device 112c is captured by the first image capturing unit 126.

Figure 2:
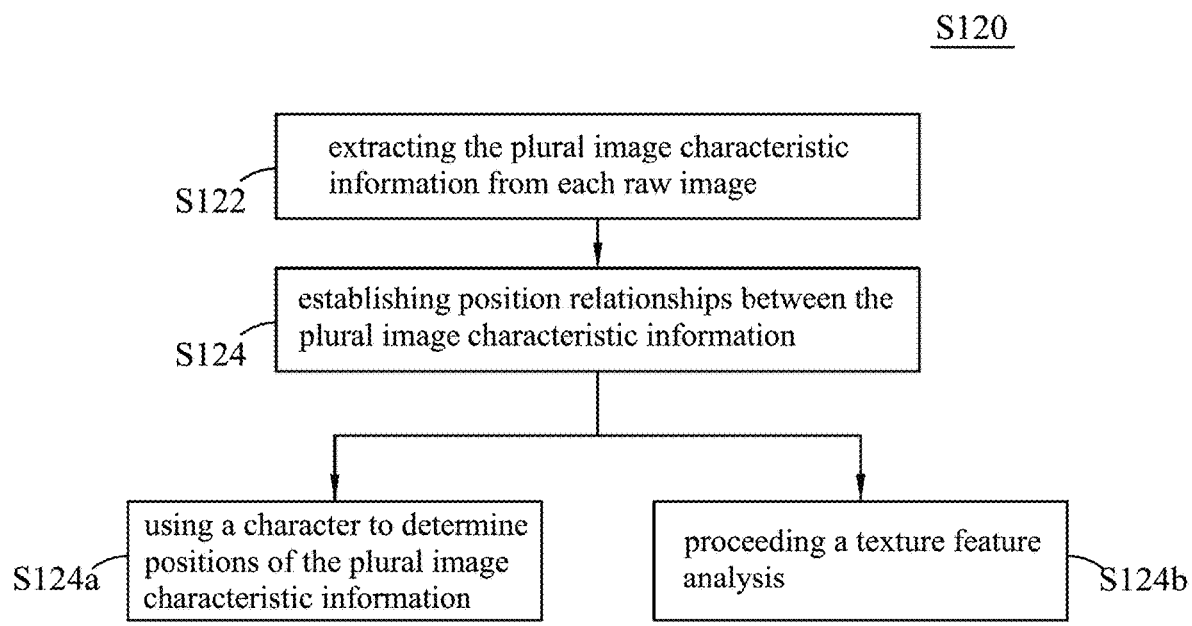
FIG. 2 is a flow chart depicting steps performed in an imaging step of the image merging method of FIG. 1.

Please refer to FIG. 2, which is a flow chart depicting steps performed in an imaging step of the image merging method of FIG. 1. In the step 120 of the imaging of each of the plural calibration devices 112, the following steps S122~S124 are performed.

At step S122, the plural image characteristic information are extracted from each raw image. In the embodiment shown in FIG. 4, the process unit 130 uses an image processing algorithm to extract the plural image characteristic information respectively from each of the plural raw images. For instance, the linear features or corner features in the plural image characteristic information can be identified using an image processing algorithm, such as harris, sobel, and so on.

In FIG. 6, the raw image 12 of the first calibration device 112a is captured by the first image capturing unit 122, whereas there are a plurality of image characteristic information 12a~12c contained in the raw image 12 in correspondence to the plural known characteristic information 114 of the first image capturing unit 122 Similarly, the raw image 24 of the second calibration device 112b is captured by the second image capturing unit 124, whereas there are a plurality of image characteristic information 24a~24c contained in the raw image 24 in correspondence to the plural known characteristic information 114 of the second image capturing unit 124; and the raw image 36 of the third calibration device 112c is captured by the third image capturing unit 126, whereas there are a plurality of image characteristic information 36a contained in the raw image 36 in correspondence to the plural known characteristic information 114 of the third image capturing unit 126.

After step S122 that is shown in FIG. 2, the step S124 is proceeded, in which the position relationships between the plural image characteristic information 12a-12c, 24a~24c and 36a are established.

At step S124a, a character is used to determine positions of the plural image characteristic information 12a~12c, 24a~24c and 36a. Taking the scale gage 116 shown in FIG. 5 for example, the coordinates of the image characteristic information 12a~12c can be determined by the markers or character symbols of the scale gage 116, while further the position relationships between the image characteristic information 12a~12c can also be established Similarly, the markers or character symbols of the scale gage 116 can also be used for establishing position relationships between the plural image characteristic information 24a~24c and 36a.

In addition to the step S124a, the step S124b can be performed optionally. At step S124b, a texture feature analysis is enabled for finding occurrence frequencies of specific textures in the plural image characteristic information so as to obtain the position relationships between the plural image characteristic information based upon the relationships of texture features found in the plural image characteristic information 12a~12c, 24a~24c and 36a.

In FIG. 6, the raw image 12 including the three image characteristic information 12a~12c is formed as a 3×3 matrix, whereas the elements in the 3×3 matrix are evenly spaced from each other. Consequently, by arranging the image characteristic information 12a at a coordinate origin (0, 0), the image characteristic information 12b will be referred as (0, -d), while the image characteristic information 12c will be referred as (0, -2d), in which d is the interval spaced between the image characteristic information 12a and the image characteristic information 12b, also is the interval spaced between the image characteristic information 12b and the image characteristic information 12c. Thereby, the position relationships between the plural image characteristic information 12a~12c can be obtained.

After the known characteristic information 114 is imaged by the calibration devices 112, the step S130 is being proceeded as shown in FIG. 1. At step S130, a conversion formula is established according to the plural known characteristic information 114 of each of the plural calibration devices 112 and the plural image characteristic information 12a~12c, 24a~24c, 36a of the corresponding image 12, 14, 16.

Taking the image merging device 100 shown in FIG. 6 for example, the process unit 130 is used for establishing a conversion formula according to the plural known characteristic information 114 of each of the plural calibration devices 112 and the plural image characteristic information 12a~12c, 24a~24c, 36a of the corresponding image 12, 14, 16.

Specifically, the conversion formula describes the corresponding relationship of an image in a space, or the corresponding relationship between images, i.e. between image capturing units. In this embodiment, the conversion formula is established by the use of an algorithm of collinearity condition equations, which is described in FIG. 7.

Figure 7:
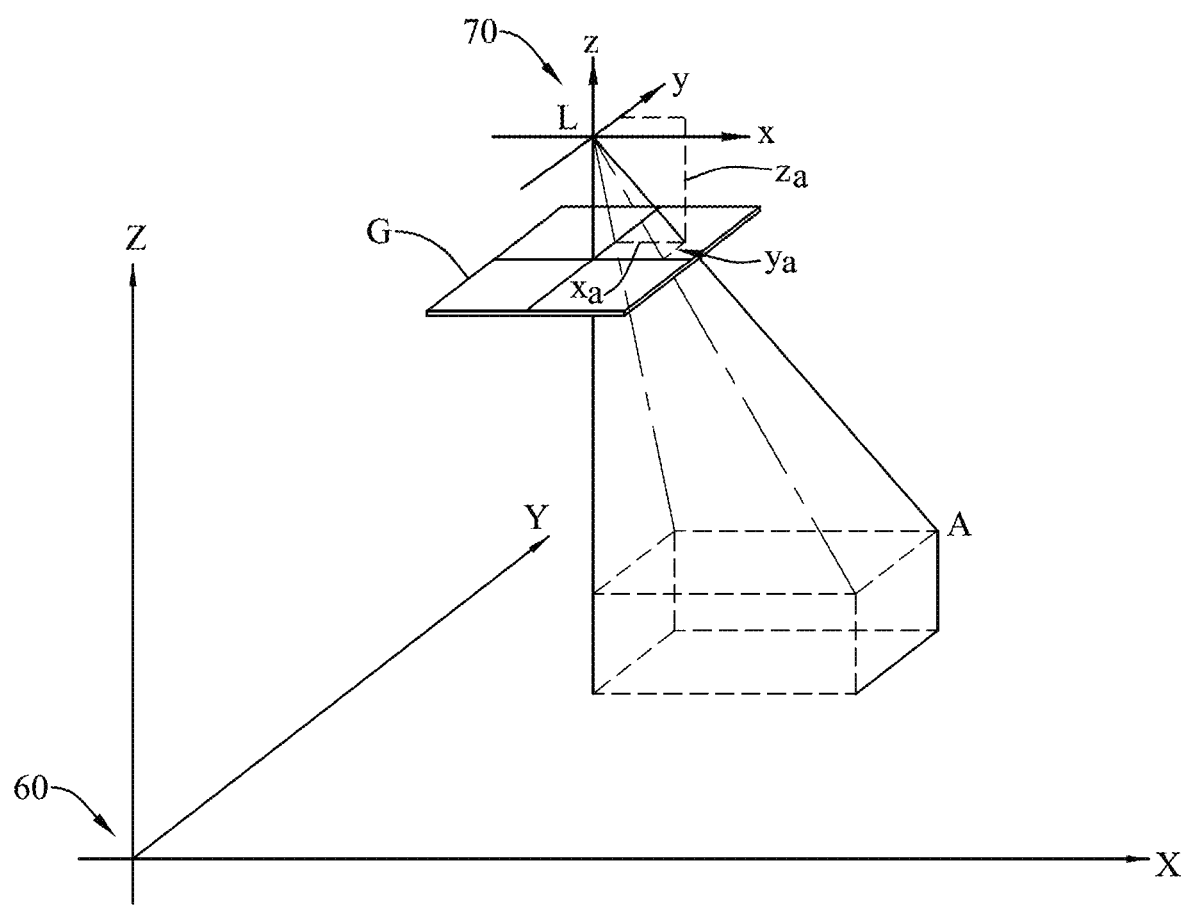
FIG. 7 is a schematic diagram showing the establishing of a conversion formula in the present disclosure.

FIG. 7 is a schematic diagram showing the establishing of a conversion formula in the present disclosure. In FIG. 7, an object coordinate system 60 and an image coordinate system 70 are provided.

As shown in FIG. 7, the object A, such as the calibration devices 112 shown in FIG. 4, is placed at $(X_A, Y_A, Z_A)$ in the object coordinate system 60 of X-axis, Y-axis and Z-axis. In this embodiment, the object A is not disposed at the origin point of the object coordinate system 60, but it is not limited thereby, that is, the object A can be disposed at the origin point of the object coordinate system 60 in another embodiments.

The image capturing unit 120, such as a camera, is disposed in the image coordinate system 70, and is enabled to capture an image of the object A. By rotating of the imaging of the object A, a rotation image place G can be obtained, whereas the center L of the camera is located at $(x_a, y_a)$ and the focal length f of the camera is the distance between the center L and the rotation image place G in the image coordinate system 70 of an x-axis, y-axis and z-axis. In this embodiment, the center L of the camera is not disposed at the origin point of the image coordinate system 70, but it is not limited thereby, that is, the center L of the camera can be disposed at the origin point of the image coordinate system 70.

The relationship between the camera imaging position and the object A can be described by the following formula:

$$\begin{bmatrix} x_a - x_0 \\ y_a - y_0 \\ y \end{bmatrix} = R_z R_y R_x \begin{bmatrix} X_A - X_L \\ Y_A - Y_L \\ Z_A - Z_L \end{bmatrix} \quad (1)$$

The formula (1) represents to the position relationship between the plural known characteristic information 114 of one calibration device 112 that is being captured by the image capturing unit 120 and the plural image characteristic information of the corresponding image of the referring calibration device. Moreover, the base coordinate of the image is $(x_0, y_0)$, but in this embodiment, it is (0, 0) for simplicity.

In addition, the base coordinate for the object coordinate system 60 is $(X_L, Y_L, Z_L)$, but also in this embodiment, it is (0, 0, 0) for simplicity. Moreover, $R_X$ represents X-axis rotation matrix, $R_Y$ represents Y-axis rotation matrix, and $R_Z$ represents Z-axis rotation matrix, that can be represented by the following formulas:

$$Rx = \begin{bmatrix} 1 & 0 & 0 \\ 0 & \cos\omega & \sin\omega \\ 0 & -\sin\omega & \cos\omega \end{bmatrix} \quad (2)$$

$$Ry = \begin{bmatrix} \cos\phi & 0 & -\sin\phi \\ 0 & 1 & 0 \\ \sin\phi & 0 & \cos\phi \end{bmatrix} \quad (3)$$

$$Rz = \begin{bmatrix} \cos\kappa & \sin\kappa & 0 \\ -\sin\kappa & \cos\kappa & 0 \\ 0 & 0 & 1 \end{bmatrix} \quad (4)$$

wherein, ω, φ, κ represent respectively the angles of X-axis rotation matrix, Y-axis rotation matrix, and Z-axis rotation matrix.

After expanding the above formulas (2), (3) and (4), the formula (5) can be obtained as following:

$$x_a = -f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right] \quad (5)$$

$$y_a = -f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

wherein, $m_{11}=\cos\phi\cos\kappa$;
$m_{12}=\sin\omega\sin\phi\cos\kappa+\cos\omega\sin\kappa$;
$m_{13}=-\cos\omega\sin\phi\cos\kappa+\sin\omega\sin\kappa$;
$m_{21}=-\cos\phi\sin\kappa$;
$m_{22}=-\sin\omega\sin\phi\sin\kappa+\sin\omega\cos\kappa$;
$m_{23}=\cos\omega\sin\phi\sin\kappa+\sin\omega\cos\kappa$;
$m_{31}=\sin\phi$;
$m_{32}=-\sin\omega\cos\phi$; and
$m_{33}=\cos\omega\cos\phi$ Dividing the formula (5) by $m_{33}$, a formula (6) is obtained as following:

$$x_a = -f\left[\frac{\frac{m_{11}}{m_{33}}(X_A - X_L) + \frac{m_{12}}{m_{33}}(Y_A - Y_L) + \frac{m_{13}}{m_{33}}(Z_A - Z_L)}{\frac{m_{31}}{m_{33}}(X_A - X_L) + \frac{m_{32}}{m_{33}}(Y_A - Y_L) + (Z_A - Z_L)}\right] \quad (6)$$

$$y_a = -f\left[\frac{\frac{m_{21}}{m_{33}}(X_A - X_L) + \frac{m_{22}}{m_{33}}(Y_A - Y_L) + \frac{m_{23}}{m_{33}}(Z_A - Z_L)}{\frac{m_{31}}{m_{33}}(X_A - X_L) + \frac{m_{32}}{m_{33}}(Y_A - Y_L) + (Z_A - Z_L)}\right]$$

As the focal length f is known in this embodiment, and the distance between the object A and the center L of the camera is set to be a constant, the value of $Z_A-Z_L$ is a constant, so that the formula (6) can be converted into a formula (7) as following:

$$x_a = \left[\frac{a_1 u + a_2 v + a_3}{a_4 u + a_5 v + 1}\right] \quad (7)$$

$$y_a = \left[\frac{b_1 u + b_2 v + b_3}{a_4 u + a_5 v + 1}\right]$$

wherein, $u = X_A - X_L$;

$v = Y_A - Y_L$;

$a_1 = \frac{m_{11}}{m_{33}}; a_2 = \frac{m_{12}}{m_{33}}; a_2 = \frac{m_{12}}{m_{33}}; a_4 = \frac{m_{31}}{m_{33}};$ $a_5 = \frac{m_{32}}{m_{33}}; b_1 = \frac{m_{21}}{m_{33}}; b_2 = \frac{m_{22}}{m_{33}}; b_3 = \frac{m_{23}}{m_{33}}.$ Formula (7) is the conversion formula needed in the present disclosure. As described in formula (7), u and v are respectively the X-axis coordinate and Y-axis coordinate of the object A in the object coordinate system 60, so that they can be obtained in advance. Consequently, the eight variables of $a_1$, $a_2$, $a_3$, $a_4$, $a_5$, $b_1$, $b_2$ and $b_3$ are the coefficients that are to be calculated. Since one formula (7) can be generated for each one of the plural known characteristic information 114, it is obvious that at least four known characteristic information 114 will be required so as to obtain the eight variables. In this embodiment, there are nine known characteristic information 114, and thus there are also nine corresponding image characteristic information, that is sufficient to obtain a solution for the formula (7). In this embodiment, the solution is obtained using a least square method, nut it is not limited thereby.

At step S140, an analysis is performed for obtaining position relationship between the plural raw images 12, 24, 36 according to the conversion formula. Taking the image merging device 100 for example, the process unit 130 is used for analyzing the position relationship between the plural image capturing units 120 according to the conversion formula. That is, according to the conversion formula in this embodiment, the position relationship between the plural image capturing units 120 can be established.

Figure 3:
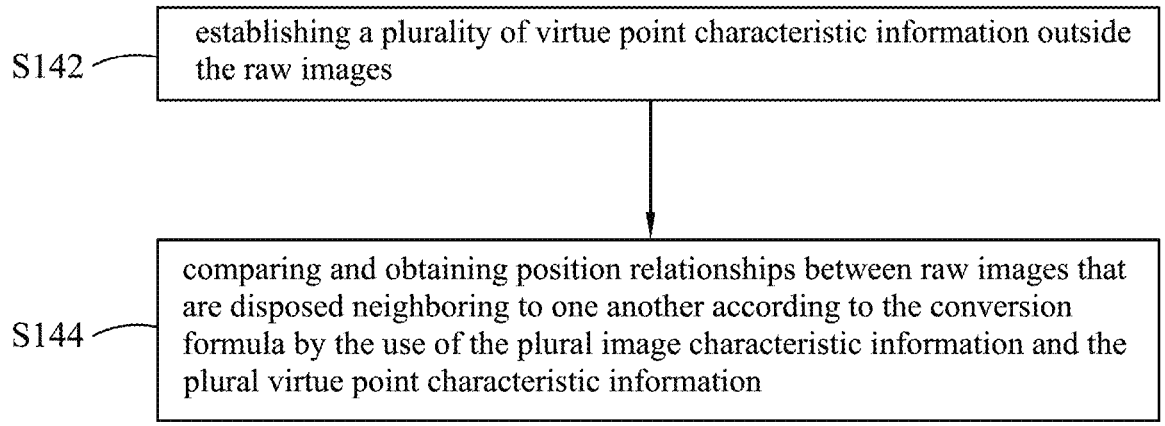
FIG. 3 is a flow chart depicting steps performed in an analysis step of the image merging method of FIG. 1.

Please refer to FIG. 3, which is a flow chart depicting steps performed in an analysis step of the image merging method of FIG. 1. As shown in FIG. 3, the step S140 further comprising the steps S142~S144.

At the step S142, a plurality of virtue point characteristic information is established outside the raw images. According to the embodiment shown in FIG. 6, the position relationship between the plural image characteristic information 12a~12c of the raw image 12 is established by the proceeding of the step 124, and consequently, the position relationship for those image characteristic information disposed neighboring to the plural image characteristic information 12a~12c can be inferred and obtained. That is, even the field of view for the first image capturing unit 122 is restricted inside the image 12, there can be a plurality of virtue point characteristic information 14a and 16a disposed outside the image 12 to be inferred and obtained, so that the field of view for the first image capturing unit 122 is somehow expanded, as the virtue images 14, 16 shown in FIG. 6. In this embodiment, the virtue images 14,16 are arranged corresponding to raw images 24, 36 of the second image capturing unit 124 and the third image capturing unit 126 in respective.

Similarly, there can be two virtue images 22, 26 to be inferred from the raw image 24 that is captured by the second image capturing unit 124, whereas the two virtue images 22, 26 are arranged corresponding to raw images 12, 36 of the first image capturing unit 122 and the third image capturing unit 126 in respective. Further, there can be two virtue images 32, 34 to be inferred from the raw image 36 that is captured by the third image capturing unit 126, whereas the two virtue images 32, 34 are arranged corresponding to raw images 12, 24 of the first image capturing unit 122 and the second image capturing unit 124 in respective.

Thus, it is not necessary to enable the image capturing units 120 to capture the complete images of the calibration unit 110, but only capture the image 12 of the first calibration device 112a in a specific region for instance, and then as the virtue images 14, 16 relating to the neighboring region of the specific region of the first calibration device 112a can be inferred and obtained, the complete images of the calibration unit 110 can be simulated and thus obtained. In another condition that the size of the calibration unit 110 is small than the object 50 for covering the object completely as shown in FIG. 4, the complete images of the object 50 can be obtained in the same virtue manner shown in the above description. Therefore, it is no need to adjust the relative positioning of the calibration unit 110 and the image capturing units 120 in the present disclosure, so that no parameter adjustment process is required for adjusting the imaging position and horizontal skew of the image capturing units 120 and also no calibration process is required for calibrating those different image capturing units 120. Consequently, the pre-operation time for preparing the image capturing units 120 can be reduced.

At step S144, a comparison is performed according to the conversion formula by the use of the plural image characteristic information and the plural virtue point characteristic information so as to obtain position relationships between raw images that are disposed neighboring to one another.

As the embodiment shown in FIG. 6, after the proceeding of the step S142, the raw image 12 with its neighboring virtue images 14, 16, the raw image 24 with its neighboring virtue images 22, 26, and the raw image 36 with its neighboring virtue images 32, 34 are inferred and acquired. Thereafter, a conversion formula (7) describing the image projection relationship between the image 12 and its corresponding virtue image 22, as shown in FIG. 7, can be established in a manner provided in the above description Similarly, a conversion formula (7) describing the image projection relationship between the image 14 and its corresponding virtue image 24 can be established, which is also true for the image projection relationship between the image 16 and its corresponding virtue image 26. Thereby, the position relationship between the first image capturing unit 122 and the second image capturing unit 124 is established, and also the position relationship between the first image capturing unit 122 and the third image capturing unit 126 is established.

Thus, the relative positioning between the first image capturing unit 122, the second image capturing unit 124 and the third image capturing unit 126 can be acquired accordingly. In an embodiment when the image characteristic information 12a of the raw image 12 is used as a datum point, not only the positions of the other image characteristic information 12b and 12c in the raw image 12 can be inferred and acquired, but also the relative position relationship between the image characteristic information 24a~24c in the raw image 24 and the image characteristic information 12a~12c can be inferred. Similarly, the relative position relationship between the image characteristic information 36a in the raw image 36 and the image characteristic information 12a~12c can also be inferred. Thus, the position relationship between the raw images 12, 24 and 36 can be acquired, that is, the conversion relationship between the plural image capturing units 120 is established.

As shown in FIG. 1, after conversion relationship between the plural image capturing units 120 is established, the step S150 is proceed. At step S150, the plural raw images 12, 24, 36 are stitched together into a composite image. That is, the images 12, 24, 36 captured respectively by the first image capturing unit 122, the second image capturing unit 124 and the third image capturing unit 126 are stitched together. The step S160 is performed after the step S150. At step S160, the object 50 is inspected.

Figure 8A:
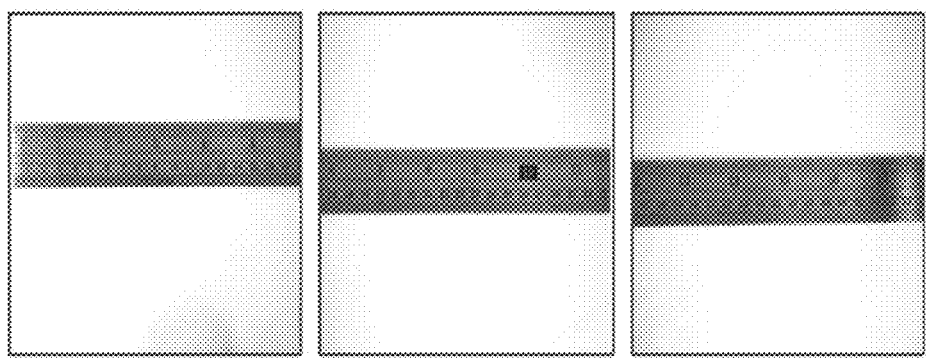
FIG. 8A is a schematic diagram showing raw images captured and used in an image merging method according to an embodiment of the present disclosure.
Figure 8B:
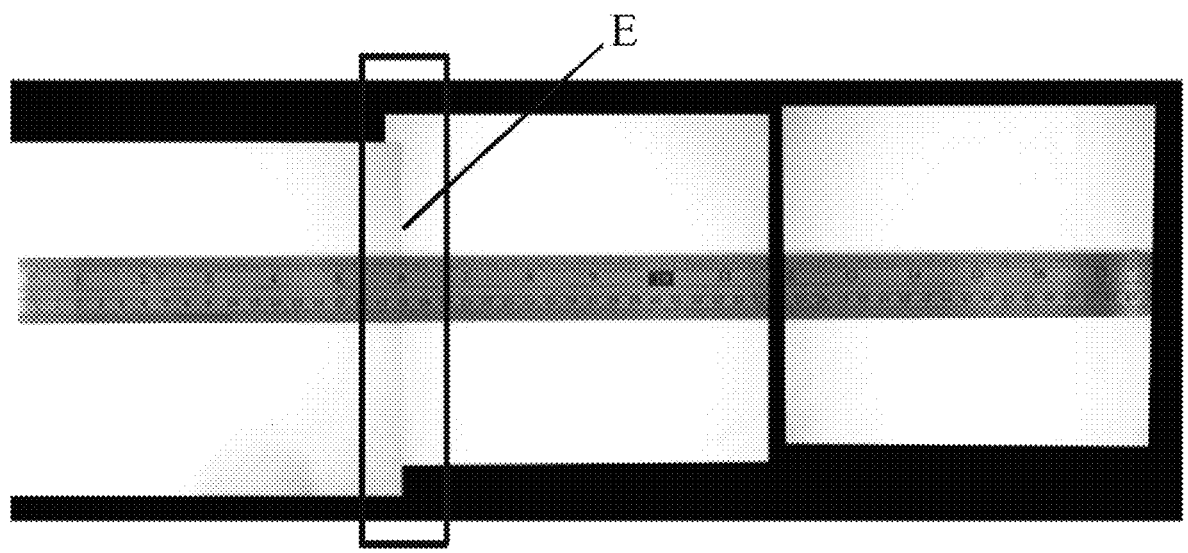
FIG. 8B is a schematic diagram showing the merging of raw images according to an embodiment of the present disclosure.
Figure 8C:
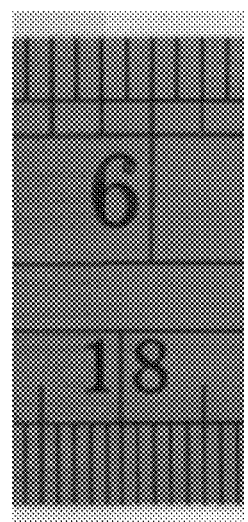
FIG. 8C is a partial enlarged view of FIG. 8B.

FIG. 8A~8C are schematic diagrams showing raw images captured and used in an image merging method according to an embodiment of the present disclosure. In this embodiment, there are three cameras that are used for capturing images, as shown in FIG. 8A. In the images captured respectively by the three cameras of FIG. 8A, it is noted that the scale gages of the three resulting images are not aligned on the same level, and furthermore, there is no overlapping between the middle image and the right image. Nevertheless, after applying the image merging method S100 by the use of the image merging device 100 that are disclosed in the present disclosure, a composite image can be obtained, as shown in FIG. 8B. Please refer to FIG. 8C, which is a partial enlarged view of FIG. 8B. In FIG. 8C, the region E represents the overlapping area between the middle image and the left image. It is noted from the numbers 6 and 18 shown in FIG. 8C that the image composition is sufficiently accurate.

To sum up, by the use of the aforesaid image merging method and device, the known characteristic information of each calibration device in the calibration unit is imaged for establishing a conversion formula between the calibration devices and the raw images, and thereby further establishing the position relationships between various image capturing units accordingly. Thereafter, basing upon the position relationships, the plural raw images are stitched together into a composite image. Consequently, the plural non-overlapping raw images are stitched together into a composite image with high precision.

In the present disclosure, it is not necessary to enable the image capturing units 120 to capture the complete images of the calibration unit in advance, but only capture the images of the first calibration unit in a specific region, and then the virtue images relating to the neighboring region of the specific region of the calibration unit can be inferred and obtained. Therefore, not only the plural non-overlapping raw images are stitched together into a composite image with high precision while achieving larger field of view relating to the object to be inspected, but also the installment cost of the image capturing units can be reduced.

In addition, it is no need to adjust the relative positioning of the calibration unit 110 and the image capturing units in the present disclosure, so that no parameter adjustment process is required for adjusting the imaging position and horizontal skew of the image capturing units and also no calibration process is required for calibrating those different image capturing units. Consequently, the pre-operation time for preparing the image capturing units can be reduced.

Since there is no need to deliberately adjust and fix the positions of the aforesaid image capturing units, the image capturing units can be arranged into arrays of any shapes at will, such as a ring-shape array, an L-shape array or a cross-shape array, according to actual requirements with respect to resolution and field of view. Consequently, there can be all sorts of image capturing units of various pixel support, resolutions, mounting angles and sizes that can be adapted for the present disclosure. Thus, the flexibility and convenience of the present disclosure are enhanced.

Operationally, since the source or stuffing are placed on a calibration unit to be imaged, and also as the calibration unit being imaged is formed with known characteristic information of obvious position relationship, it is easy to extract image characteristic information without being adversely affected by the source or stuffing on the calibration unit. Thereby, the imaging precision is enhanced for achieving an image merging with high precision, and consequently the capability of the resulting visual inspection system is increased.

Moreover, in an embodiment, after applying the image merging method on the imaging of a scale gage by the use of the image merging device, a composite image can be obtained with high precision. Thus, the image merging method and device of the present disclosure can achieving high-precision image merging.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An image merging method, comprising the steps of:
   providing a plurality of calibration devices, being arranged corresponding to different positions of an object to be inspected, wherein each of the calibration devices includes a plurality of known characteristic information;
   obtaining raw images of the calibration devices respectively, wherein each of the raw images corresponds to one of the calibration devices, each of the raw images includes a plurality of image characteristic information that are corresponding to the known characteristic information of its corresponding calibration device;
   establishing a conversion formula according to the known characteristic information of each of the calibration devices and the image characteristic information of the corresponding image;
   performing an analysis for obtaining position relationship between the raw images according to the conversion formula, comprising:
     establishing a plurality of virtual point characteristic information, wherein the virtual point characteristic information for each raw image corresponds to a plurality of virtual images outside the raw image, and the virtual images are arranged to correspond to other raw images, wherein two virtual images can be inferred from each raw image; and
     comparing and obtaining position relationships between raw images that are disposed neighboring to one another according to the conversion formula by the use of the image characteristic information and the virtual point characteristic information; and
   merging the raw images.

2. The image merging method of claim 1, wherein the imaging of each of the calibration devices further comprising the step of:
   extracting the image characteristic information from each raw image.

3. The image merging method of claim 2, wherein the extracting of the image characteristic information further comprising the step of:
   identifying linear features or corner features in the image characteristic information.

4. The image merging method of claim 2, wherein the extracting of the image characteristic information further comprising the step of:
   establishing position relationships between the image characteristic information.

5. The image merging method of claim 4, wherein the establishing of the position relationships between the image characteristic information further comprising the step of:
   using a character to determine positions of the image characteristic information.

6. The image merging method of claim 5, wherein the using of the character to determine positions of the image characteristic information further comprising the step of:
   using markers or character symbols of a scale gage to determine positions of the image characteristic information.

7. The image merging method of claim 4, wherein the establishing of the position relationships between the image characteristic information further comprising the step of:
   proceeding a texture feature analysis.

8. The image merging method of claim 7, wherein the texture feature analysis is enabled to obtain the position relationships between the image characteristic information based upon the relationships of texture features found in the image characteristic information.

9. The image merging method of claim 8, wherein the texture feature analysis further comprising the step of:
   finding occurrence frequencies of a specific texture for the image characteristic information, wherein the texture features found in the image characteristic information comprise the specific texture.

10. The image merging method of claim 1, wherein the conversion formula is established by the use of an algorithm of collinearity condition equations.

11. The image merging method of claim 1, wherein after the merging of the raw images, the method further comprising the step of:
    inspecting the object to be inspected.

12. An image merging device, comprising:
    a plurality of calibration devices, being arranged at different positions of an object to be inspected, wherein each of the calibration devices includes a plurality of known characteristic information;
    a plurality of image capturing devices, each being provided for capturing a raw image of its corresponding calibration device; and
    a processing unit, coupled to the image capturing devices for receiving the raw images captured by the image capturing devices;
    wherein each of the raw images includes a plurality of image characteristic information that are corresponding to the known characteristic information of its corresponding calibration device, and the processing unit is enabled to establish a conversion formula according to the known characteristic information of each of the calibration devices and the image characteristic information of the corresponding image, moreover, the processing unit is enabled to perform an analysis for obtaining position relationship between the image capturing devices and the object according to the conversion formula so as to stitch the raw images, comprising:
      establishing a plurality of virtual point characteristic information, wherein the virtual point characteristic information for each raw image corresponds to a plurality of virtual images outside the raw image, and the virtual images are arranged to correspond to other raw images, wherein two virtual images can be inferred from each raw image; and
      comparing and obtaining position relationships between raw images that are disposed neighboring to one another according to the conversion formula by the use of the image characteristic information and the virtual point characteristic information.

13. The image merging device of claim 12, wherein each of the calibration device further comprising:
a scale gage, being disposed at the periphery of the known characteristic information.

14. The image merging device of claim 12, wherein the known characteristic information are alternatively arranged into an array.

15. The image merging device of claim 12, wherein each of the image capturing devices is a device selected from the group consisting of: a charge-coupled device (CCD), a complementary metal-oxide semiconductor (CMOS), a pan-tilt-zoom camera, and a digital monitor.

16. The image merging device of claim 12, wherein the processing unit uses an image processing algorithm to extract the image characteristic information respectively from each of the raw images.

17. The image merging device of claim 12, wherein the conversion formula is established by the use of an algorithm of collinearity condition equations.

18. The image merging device of claim 12, wherein each of the calibration devices is substantially a textured plane with non-specific iteration structures.

19. The image merging device of claim 12, wherein each of the known characteristic information is a shape selected from the group consisting of: a rectangle, a square, a triangle, and a cross.

20. The image merging device of claim 12, wherein each of the known characteristic information is feature selected from the group consisting of: a line and a character.

21. The image merging device of claim 13, wherein the scale gage is formed with markers or character symbols, and the markers or the character symbols are provided for a user to determine the coordinates of the known characteristic information and also the relative position relationships between the known characteristic information.

* * * * *